Jan. 15, 1935.  P. WIRTH  1,988,227
FILTER
Filed June 16, 1932
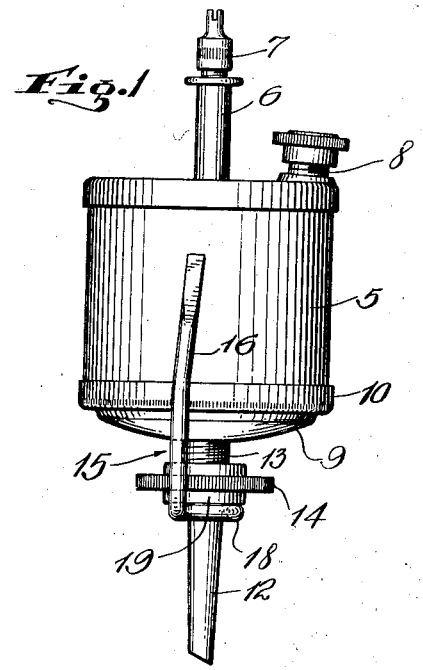
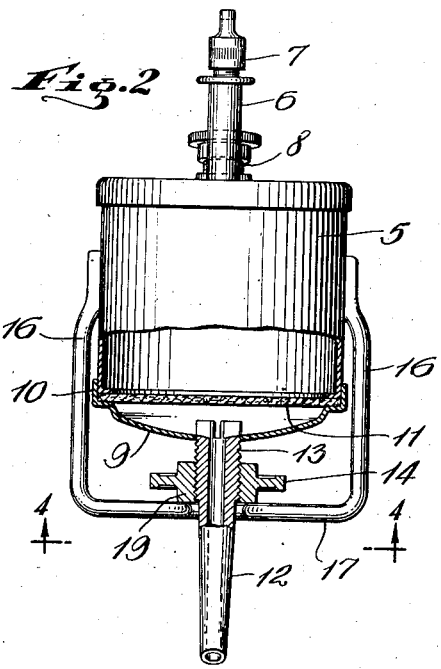
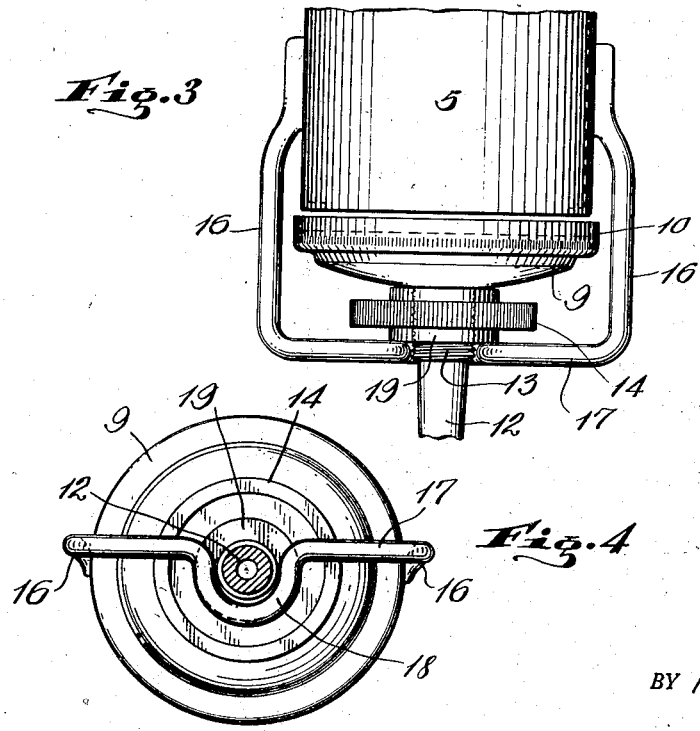
INVENTOR.
PHILIPP WIRTH
BY Meyers & Jones
ATTORNEY.

Patented Jan. 15, 1935

1,988,227

UNITED STATES PATENT OFFICE 1,988,227

FILTER

Philipp Wirth, New York, N. Y.

Application June 16, 1932, Serial No. 617,645

4 Claims. (Cl. 210—185)

My invention relates to filters, particularly of the type used in laboratory work for filtering liquids, and resides in the provision of means for tightly closing the filter and effecting a tight seal between the parts of the filter and the filter disc to prevent leakage.

Filters used in laboratories are of several types, some operating by pressure and some by suction to force liquids through the filtering element, usually in the form of a disc. Unless the edge of the disc is clamped tightly there will be leakage when the liquid is passing through the filter. The most common means for clamping and compressing the filter pad or disc have been bolts and nuts engageable with the filter casing and spout member to draw them together with the filter pad clamped therebetween. This means is not only inconvenient to manipulate due to the plurality of bolts and nuts, but is cumbersome, expensive and does not automatically provide even compression on all parts of the filter pad. Another means has been to provide the casing and spout part with cooperating screw threads to directly secure them together, but this does not provide a good tight seal and when used on suction filters air is sucked in between the screw threads causing foaming of the liquid, which is a condition to be avoided. Furthermore, liquid oozing or leaking out from the sides of the filter pad will get into the sterile flasks, which is also to be avoided.

In accordance with my present invention, one of the parts of the filter, preferably the casing or chamber into which the liquid is discharged, is provided with a yoke rigidly connected thereto, the yoke having a cross-arm positioned across the open end of the casing in spaced relation thereto. The other part of the casing, which may be called the spout portion, includes a cap to fit the open end of the casing beneath the cross-arm of the yoke and is provided with a flange to fit around the wall of the casing at its open end. This flange may be slightly spaced from the wall of the casing to provide a channel to retain any liquid which may ooze out, which will be a small amount, if any, due to the tight seal provided by my invention. The filter disc is disposed within the cap and flange so that when the cap is applied to the open end of the casing, the upper edge of the open end of the casing will engage against the surface of the disc, the other surface of which will be against the portion of the cap. The cap has a spout rigidly connected thereto and a portion of the spout is provided with screw threads adjacent the cap to receive a nut, preferably in the form of a disc having its external periphery knurled to facilitate grasping and turning on the screw threaded portion of the spout, so that the nut can be thus moved until it bears against the cross-arm of the yoke to draw the cap and casing tightly together to compress the entire edge of the disc between the edge of the open end of the casing and the inner surface of the cap.

Thus, and as will be more fully explained in detail hereinafter, the parts of the filter may be quickly and tightly assembled to prevent leakage of liquid by a single operating member, and with the compressing parts carried by the respective parts of the casing so that there is no likelihood of any of the elements becoming lost, because when the only movable part, namely, the nut, is turned to permit the spout member to be removed from the casing it must move on the screw threads on the spout nearer to the cap or away from the free end of the threads.

The objects and advantages of the invention may thus be seen to reside in the provision of a simple, durable, easily operated and highly effective means of sealing a filter, and susceptible of manufacture at a relatively low cost.

The foregoing and other objects and advantages of the invention will become apparent during the course of the following description of the accompanying drawing, in which Fig. 1 is a side elevation of a filter with the invention applied thereto;

Fig. 2 is a view similar to Fig. 1 looking in another direction and with parts shown in section;

Fig. 3 is a fragmentary and large elevation showing the closure in position for removal from the filter; and Fig. 4 is a view taken on the line 4—4 of Fig. 2.

Referring to the drawing, the numeral 5 designates a casing through one end of which is mounted a stem 6 provided with a valve coupling 7 on its outer end for connection with a conduit leading from a source of compressed air. There is also mounted through said end of the casing 5, an inlet 8 for connection with conduit leading from a source of liquid to be filtered. The other end of the casing is open and is adapted to be closed when filtering the liquid by a cap 9 having a marginal flange 10 to engage around the sides of the casing adjacent its open end. The cap 9 receives the filtering elements including a disc 11 of porous filtering material through which the liquid is forced by the compressed air introduced through the stem 6. The cap 9 has rigidly connected thereto a spout 12 which is provided adjacent the cap with screw threads 13 which receive a nut 14 which, as illustrated, may be in the nature of a disc provided with a knurled periphery to facilitate grasping and turning of the nut.

A yoke indicated generally by the reference character 15 has side arms 16 rigidly connected to opposite sides of the casing and an intermediate arm or cross-rod 17 extending across the open end of the casing in spaced relation thereto preferably a distance approximately the same as the distance between the bottom of the flange 10 and the end of the screw threads 13. The cross-rod 17 is provided with a bend 18 at its approximate center to receive the spout 12 when the cap 9 is applied to the open end of the casing, at which time the disc 11 will be situated between the free edge of the walls of the casing and the interior of the cap 9. With the parts so assembled, it will be obvious that when the nut 14 is turned on the threads 13 to move it toward the cross-rod 17 of the yoke 15 that eventually the nut will come into contact with the bend 18 and as the nut is turned in contact with the bend 18 that the cap 9 and casing 5 will be drawn or forced together to compress the portion of the disc 11 between the free end of the casing and the interior of the cap 9. The compression may be quickly and conveniently created to such an extent with relatively light effort as to tightly and completely seal the closure between the casing and cap to prevent escapement of liquid.

It will be understood that the device can be furnished complete with the parts assembled in the position shown in Fig. 1, and it will be impossible for the parts to become disassembled because the nut 14 must be moved inwardly on the screw threads 13 until it is substantially in contact with the cap 9 before there will be sufficient clearance provided between the flange 10 and open end of the casing to permit withdrawal of the spout member.

All of its threads are in engagement with threads on the spout member and there are still threads of the spout member between the nut and the free end of the spout, so that there is no likelihood of the nut becoming accidentally displaced or lost. Thus, the filter is provided in two parts forming a complete unit. To assemble it, it is simply necessary to insert the cap with the nut screw down thereagainst into the space between the side arm 16 and cross-rod 17 of the yoke until the spout is seated in the bend 18, at which time the flange 10 will engage around the sides of the casing. Then by turning the nut 14, the parts may be tightly drawn together as previously explained to tightly seal the casing.

I have shown on the nut 14 an upstanding annular rib 19, the circumference of which is substantially the same as the width of the bend 18 in the cross arm of the yoke. This upstanding annular rib is adapted for contact with the bend when the nut is screwed against the yoke to compress the parts, and may be so polished or formed as to create relatively little friction and facilitate the binding movement of the parts.

I have shown and described a pressure operated filter merely for the purposes of illustration but do not limit the invention to such filter as it is applicable with equal efficiency to other types and styles of filters of various sizes and uses.

I claim:

1. A filter of the character described comprising a casing having an open end, a closure cap for the open end having a marginal flange to fit around said end, a spout connected to the cap, a yoke rigidly and permanently connected to the casing and having an arm extending across the cap in spaced relation thereto, a screw threaded portion on the spout between said arm of the yoke and the cap, said yoke having an opening at one side to receive the spout, and a nut carried by said screw threaded portion and moveable thereon against the yoke to force the casing and cap toward each other, said yoke and spout being disconnected, whereby the cap with the spout and nut may be removed from the casing and the yoke will be retained on the casing in fixed position.

2. A filter of the character described comprising a casing having an open end, a closure cap for the open end, a spout connected to the cap, a yoke rigidly connected to the casing and having an arm extending across the cap in spaced relation thereto, a screw threaded portion on the spout between said arm of the yoke and the cap, and a nut carried by said screw threaded portion and moveable thereon against the yoke to force the casing and cap toward each other, said cross arm having a bend to receive the spout and against which the nut bears.

3. A filter of the character described comprising a casing having an open end, a closure cap for the open end, a spout connected to the cap, a yoke rigidly connected to the casing and having an arm extending across the cap in spaced relation thereto, a screw threaded portion on the spout between said arm of the yoke and the cap, and a nut carried by said screw threaded portion and moveable thereon against the yoke to force the casing and cap toward each other, said cross arm having a bend to receive the spout and against which the nut bears, and said nut having an upstanding annular rib to abut said bend.

4. A filter of the character described comprising a casing having an open end, a closure cap for the open end of the casing, a yoke rigidly connected to the casing and having an arm extending across the cap in spaced relation thereto and provided with a bend intermediate its ends, a spout connected to the cap independently of the yoke, a screw threaded portion on the spout between said arm of the yoke and the cap when the cap is applied to the casing, and a nut carried by said screw threaded portion and movable thereon against the bend in the yoke to force the casing and cap toward each other, the nut being movable toward the cap on the screw threads of said screw threaded portion to enable removal of said cap from the casing and being retained by said threads when the cap is removed.

PHILIPP WIRTH.